Dec. 14, 1926.
J. J. DOWNEY
1,610,937
BUMPER ATTACHING DEVICE
Filed Jan. 19, 1924
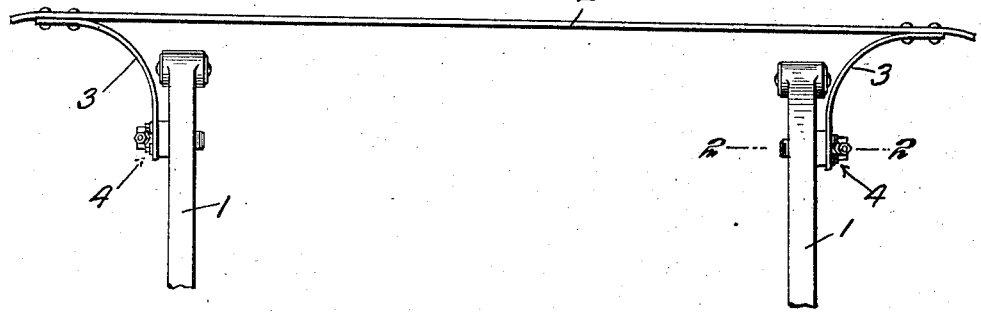
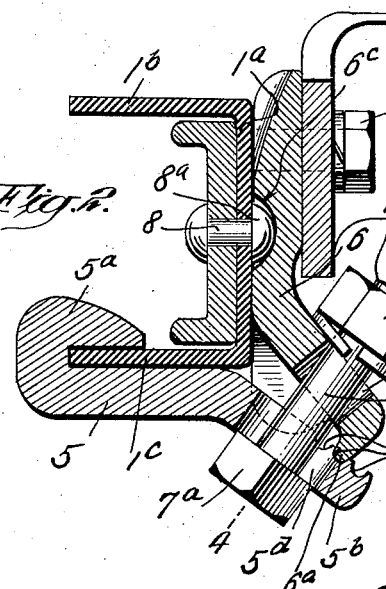
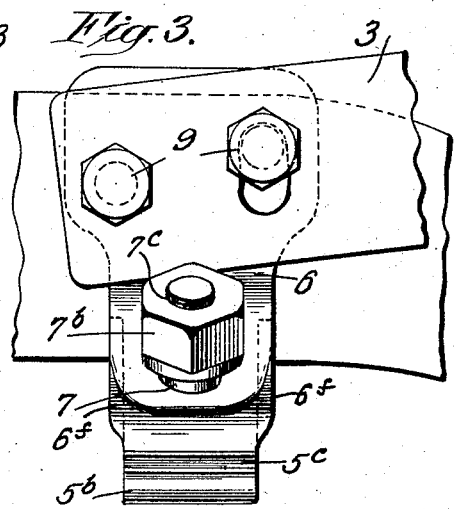
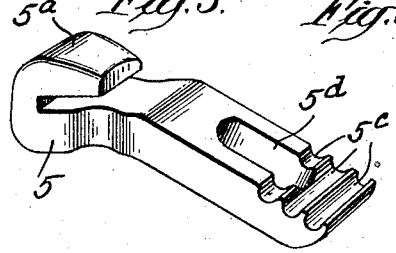
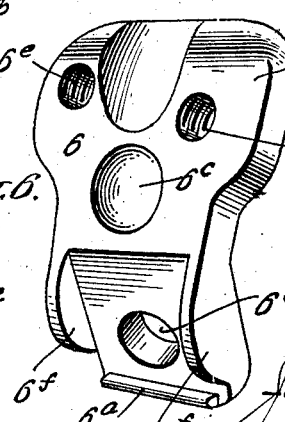
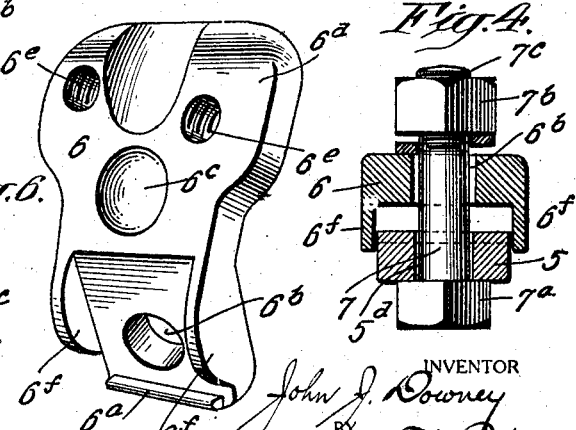
INVENTOR
John J. Downey
BY
Joseph F. O'Brien
His ATTORNEY Patented Dec. 14, 1926.

1,610,937

UNITED STATES PATENT OFFICE.

JOHN J. DOWNEY, OF NEW YORK, N. Y.

BUMPER-ATTACHING DEVICE.

Application filed July 19, 1924. Serial No. 726,932.

This invention relates to improvements in bumper-attaching devices.

One of the objects of my invention is to provide an attaching device for automobile bumpers which is capable of adjustment to permit ready and quick mounting at varying points along the frame end of the chassis and may be rigidly retained in position therein.

Another object of my invention is to provide an attaching device which will effectively prevent the dropping or downward sagging of the bumper and which will maintain a firm grip upon the channel-bar frame-ends of the automobile.

Another object of my invention is to produce a bumper-attaching device which will utilize a shearing action or pressure on the channel-bar frame-end to clamp the parts thereto.

Another object of my invention is to utilize a bumper-attaching-device in which clamping pressure is procured by the application of screw pressure to two parts, one of which is fulcrumed on the other.

Another object of my invention is to produce a bumper-attaching-device of relatively small size and composed of two fulcrumed members, by means of which screw pressure may be effectively applied to produce a shearing action on the frame-ends to the end that the clamp may be firmly and securely applied on such frame-ends.

Another object of my invention is to provide an attaching-device adapted to utilize the rivet heads in the frame-ends as anchoring means to assist in preventing dropping of the fastening device or clamp.

Another object of my invention is to provide a device composed of two clamping members, one of which is anchored on the lower flange and the other of which is anchored on a rivet head and means for applying clamping pressure between the two members.

With these and other objects in view, the invention comprises the combination of members and arrangement of parts so combined as to co-act and cooperate with each other in the performance of the functions and the accomplishment of the results herein contemplated, and comprises in one of its adaptations the species or preferred form illustrated in the accompanying drawings, in which:—

Fig. 1 is a plan view of a bumper attached to the frame-ends of a motor vehicle;

Fig. 2 is a section on the line 2—2 of Fig. 1;

Fig. 3 is an enlarged view in elevation of one end portion of a bumper bar connected to the frame end by the use of my improved clamps;

Fig. 4 is a section on the line 4—4 of Fig. 2;

Figs. 5 and 6 are, respectively, perspective views of the clamping members employed by me.

Referring now to these drawings, which illustrate a preferred embodiment of my invention, 1 indicates two parallel outwardly-extending frame-ends or rails at the front end of the chassis of a motor vehicle, which frame ends are usually of channelled cross-section, as indicated in Fig. 2, to provide a web-portion $1^a$ and upper and lower flange-portions $1^b$—$1^c$.

2 indicates a bumper of any suitable type which it is desired to mount on said frame-ends or rails. In the embodiment shown, the bumper 2 is attached to a pair of outwardly-extending supporting or attaching bars 3. These supporting bars are secured to the frame-ends or rails by attaching-devices or clamps 4 which are composed of two members arranged to have a shearing movement and to apply a shearing pressure on the frame end, and preferably to bear or abut against one of the flanges and the web portion of such frame end or rail.

In the preferred form illustrated, the clamp comprises a flange-engaging member 5 and a web-engaging member 6, one of which members is fulcrumed on the other in a vertical plane remote from the side of the frame end or rail 1 and screw pressure is applied on the two members between the said fulcrumed edges of the member and the rail-engaging portions. This is preferably accomplished by means of a bolt 7, so that the members apply a shearing pressure on the rail 1 through the web $1^a$ and flange $1^c$. As illustrated, the member 5 is provided with a hook $5^a$ which is adapted to fit over the flange $1^c$ and may therefore be initially supported on the said flange. Said member 5 also preferably has an outwardly and downwardly inclined projecting portion $5^b$ which is provided on its upper surface with a series of grooves $5^c$ into one of which a fulcrumed toe 6ᵃ of the other member 6 is adapted to seat for the purpose of fulcruming said member 6 upon the member 5. By providing a series of such fulcrum-grooves 5ᶜ, adjustment is provided to enable the clamp to be positioned at varying positions along the bar, it being understood that the width of the bars 1 varies from the front toward the rear, so that when the clamps are positioned close to the front end of the bar the inner fulcrum groove will be utilized while the second and third grooves will be utilized when the clamps are positioned further toward the rear of said bar. Both members are provided with registering bolt holes and, as shown, the member 5 is provided with an elongated bolt hole 5ᵈ so that pressure may be applied through the bolt 7 in the various adjusted positions of the device, and the member 6 is provided with a registering bolt hole 6ᵇ. The bolt 7 is provided with a head 7ᵃ at one side of larger size than the bolt hole 5ᵈ and a nut 7ᵇ is applied upon the screw-threaded opposite end 7ᶜ of said bolt. Tightening up on the nut 7ᵇ will thus cause clamping pressure to be applied between the members 6 and 5, and will result in a shearing motion of the parts. Application of the power through the bolt 7 is thus preferably applied between the fulcrumed portion and the bar to which the members are fastened.

In the preferred embodiment of my invention, the member 6 is provided with a socket 6ᶜ adapted to fit over one of the heads 8ᵃ of the rivets 8 usually found in said frame-ends 1, thus enabling a rivet head to be utilized as an anchor for the web-engaging member, while the hook or bill portion 5ᵃ enables the flange to be utilized as an anchor for the flange-engaging member 5. The web-engaging member 6 is also preferably formed with a relatively wide bracket portion 6ᵈ which is provided with bolt holes 6ᵉ into which fit bolts 9 for fastening the bars 3 to the web-engaging member 6.

The said web-engaging member 6 is preferably provided with downwardly extending flanges 6ᶠ which embrace the projecting portion 5ᵇ at opposite sides and prevent the relative lateral movement between the projecting fulcrumed portions of two members 5 and 6.

It will be seen furthermore that the shape of the fulcrum toe 6ᵃ raises the outwardly projecting portion of the web-engaging member 6 to space the same from the flange engaging member and allow for shearing motion therebetween about the said fulcrum 6ᵃ and thus procure a secure fastening of the two members to the frame-ends.

Having described my invention, I claim:—

1. An attaching device for fastening bumpers to automobile frame-ends embodying clamps, each comprising a plurality of members, one of which is fulcrumed on the other and means for applying pressure at one side of said fulcrum to cause the members to apply a shearing pressure on said frame-ends.

2. An attaching device for fastening bumpers to automobile channel-bar frame-ends embodying clamps, each comprising a plurality of fulcrumed members, one of which is provided with a hook fitting over a flange of said frame-end and means for applying pressure at one side of said fulcrum to cause the members to apply a shearing pressure on said frame-ends.

3. An attaching device for fastening bumpers to automobile frame-ends embodying clamps, each comprising two members having portions disposed at substantially right angles to provide a seat for the side and bottom of a channel bar, one of which members is fulcrumed on the other at a point relatively remote from said frame and means for applying pressure between said fulcrumed point and said frame.

4. An attaching device for fastening bumpers to automobile channel-bar frame-ends embodying clamps, each comprising two members, one being fulcrumed on the other at a point relatively remote from said frame-end, and one of said members having a hook-portion for fitting over and engaging a flange of said frame-end, and a nut and bolt for applying pressure between said fulcrumed point and said frame.

5. An attaching device for fastening bumpers to automobile channel-bar frame-ends embodying clamps, each comprising two members, each having outwardly-projecting cooperative portions bent at an angle to the body portions of such members, one of which bent portions is fulcrumed on the other and one of said members having a hook-portion for fitting over and engaging a flange of said frame-end, and means for applying pressure between said fulcrum and the channel-bar frame-ends.

6. An attaching device for fastening bumpers to automobile channel-bar frame-ends embodying clamps, each comprising two members, one having a flange-engaging hook and both having outwardly-projecting cooperating portions, one of which portions has a fulcrum and the other is provided with means for preventing slipping of the fulcrum of the other, and also providing adjustment between the two clamping members to enable application thereof on channel-bar frame-end at places varying in width.

7. An attaching device for fastening bumpers to automobile channel-bar frame-ends embodying clamps, each comprising two members, one having a flange-engaging hook and both having outwardly projecting fulcrumed portions, one of which is provided with a plurality of fulcrum grooves and the other of which is provided with a fulcrum cooperative with either of said grooves to clamp on a channel-bar frame-end at places varying in width.

8. An attaching device for fastening bumpers to automobile channel-bar frame-ends embodying clamps, each comprising two members, one having a flange-engaging hook and both having outwardly projecting fulcrumed portions, one of said members being provided with side flanges embracing the side edges of the other member to prevent side-slipping of said members.

9. An attaching device for fastening bumpers to automobile channel-bar frame-ends embodying, in combination, a clamp member abutting against the lower flange of an automobile channel-bar frame-end having at one end a hook portion adapted to fit over and seat on the upper face of said flange and the opposite end extending beyond said frame end and provided with a series of grooves arranged transversely to the longitudinal axis of said member, another member engaging the web of said channel-bar frame-end and having an outwardly projecting portion fulcrumed in one of the grooves on said other member, and pressure applying means arranged between said fulcrumed portion and the frame-end for applying a shearing stress by said members on said frame end.

10. An attaching device for fastening bumpers to automobile channel-bar frame-ends embodying, in combination, a clamp member abutting against the lower flange of an automobile channel-bar frame-end having at one end a hook portion adapted to fit over and seat on the upper face of said flange and the opposite end extending beyond said frame end and provided with a series of grooves arranged transversely to the longitudinal axis of said member, another member engaging the web of said channel-bar frame-end and having an outwardly projecting portion fulcrumed in one of the grooves on said other member, and a nut and bolt arranged between said fulcrumed portion and the frame end for applying a shearing stress by said members on said frame-end.

11. An attaching device for fastening bumpers to automobile channel-bar frame-ends embodying clamps, each comprising two fulcrumed members, one of which is provided with a hook portion fitting over the lower flange of said frame-end to provide an anchor therefor, and the other member having a depression in its rear face for embracing a rivet head on said frame-end to anchor the same thereto, and means for applying pressure at one side of said fulcrum to cause the members to apply a shearing pressure on said frame-end.

12. An attaching device for fastening bumpers to automobile channel-bar frame-ends embodying, in combination, a clamp member abutting against the lower flange of an automobile channel-bar frame-end having at one end a hook portion adapted to fit over and seat on the upper face of said flange and the opposite end extending beyond said frame-end and provided with a series of grooves arranged transversely to the longitudinal axis of said member, another member engaging the web of said channel-bar frame-end and having an outwardly projecting portion fulcrumed in one of the grooves on said other member and being provided in its rear face with a depression for embracing a rivet head on said frame-end to anchor the same thereto and a nut and bolt arranged between said fulcrumed portion and the frame end for applying a shearing stress by said members on said frame-end.

In witness whereof, I have signed my name to the foregoing specification.

JOHN J. DOWNEY.